July 27, 1943.  R. H. KAUFMANN  2,325,407
DYNAMO-ELECTRIC MACHINE
Filed May 31, 1941

Inventor:
Richard H. Kaufmann,
by Harry E. Dunham
His Attorney.

Patented July 27, 1943

2,325,407

UNITED STATES PATENT OFFICE 2,325,407

DYNAMOELECTRIC MACHINE

Richard H. Kaufmann, Schenectady, N. Y., assignor to General Electric Company, a corporation of New York Application May 31, 1941, Serial No. 395,929

5 Claims. (Cl. 171—223)

My invention relates to dynamo-electric machines and more particularly to dynamo-electric generators of the self excited direct current type.

There are many instances where it is desirable to use a direct current generator as a variable voltage machine with shunt field rheostatic control of voltage either by the use of an automatic field rheostatic type of voltage regulator or by hand control of the shunt field rheostat. This control is often used with constant speed direct current machines. The object of such control may be, for example, the maintenance of substantially constant voltage on an alternating current generator by the regulation of its exciter shunt field circuit. In cases where the voltage of a self excited direct current generator is regulated by shunt field rheostatic control the machine becomes unstable and produces unsatisfactory regulation if operation is attempted at voltages below the knee of the magnetization curve and at values along the straight portion of the curve. This impairs the usefulness of such machines since the range of output voltage variation is limited to voltages above the knee of the magnetization curve.

The reason such direct current generators tend to become unstable at low voltages with relatively high values of shunt field circuit resistance is due to the characteristics of self excited generators. Briefly stated these characteristics are as follows: If a self excited direct current generator is operating at a voltage corresponding to a point above the knee of the magnetization curve and the resistance of the shunt field circuit is increased a small amount, the voltage and the current of the shunt field circuit will both decrease until the ratio of voltage to current of the circuit is equal to the new resistance of the shunt field circuit. This may be expressed another way by saying that stability is reached when there is a definite intersection point between the field circuit resistance characteristic line and the magnetization or terminal voltage-field current curve of the generator. If now the field circuit resistance is increased still further a point will be reached at which the voltage applied to the shunt field circuit decreases at the same rate as the current in the shunt field circuit decreases and at this point the generator becomes unstable because for a given value of resistance there may be a number of different voltage values of the generator. Expressed differently, it may be said that instability occurs when the shunt field resistance characteristic coincides with the magnetization curve of the generator. The part of the magnetization curve in which coincidence occurs is the relatively straight portion of the curve between the knee and the residual voltage point.

It is possible to build special self excited direct current generators that are inherently stable down to relatively low values of voltage by use of partial air gaps in the magnetic structure of the main field pole which is so designed as to cause saturation of certain portions at low voltages. This has the effect of bending over the magnetization curve causing it to depart from the straight line at a low voltage and before the portion of the curve known as the knee is reached. This construction requires modification of the main field pole in a special manner and increases stability only above the point where the restricted section of the field pole saturates.

An object of my invention is to provide a dynamo-electric machine having an improved excitation system.

More particularly it is an object of my invention to provide means for increasing the stability and range of operation of a direct current generator, the voltage of which is controlled by varying the resistance in its field circuit.

In accordance with my invention I provide an arrangement for increasing the stability of self-excited direct current generators whose voltages vary to relatively low values through the insertion of relatively large resistances in the shunt field circuit of the generator. This arrangement comprises the provision of auxiliary shunt connected field windings having field poles arranged to saturate at relatively low values of armature voltage as compared with the main field poles. The displacement in armature voltage produced by the auxiliary field poles gives the machine positive voltage stability at any particular rheostat setting in the main field circuit, the magnetization curve of the generator being so modified that there is a definite intersecting point between the field resistance characteristic line and the magnetization curve at all values of field circuit resistance.

My invention will be better understood from the following description taken in connection with the accompanying drawing and its scope will be pointed out in the appended claims.

In the drawing Fig. 1 is a diagrammatic view of a generator constructed in accordance with my invention.

Figure 1:
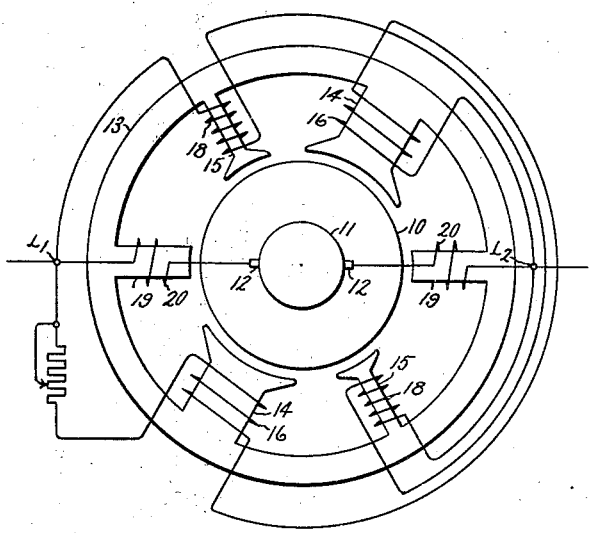

Referring to the drawing, 10 represents the armature of a two pole direct current type of dynamo-electric generator having the usual commutated armature winding (not shown) provided with a commutator 11 and commutator brushes 12 connected to the machine terminals $L_1$ $L_2$. The field yoke is designated at 13.

In accordance with my invention the field excitation system comprises a plurality of field magnet cores, each of which is divided or split into a main portion 14 and an auxiliary portion 15. The main core portions 14, which are of standard construction, are provided with exciting windings 16 connected in parallel relation with the armature circuit and which supply a substantial portion of the armature flux. The terminal voltage of the machine is varied in the usual manner by means of a field rheostat 17 connected in series with the exciting winding 16.

The auxiliary core portions 15 are provided with exciting windings 18 which are also connected in parallel relation with the armature circuit by a circuit separate from the energizing circuit of the main field windings. The auxiliary field structure is special in construction in that it utilizes a fairly small cross section core and is equipped with an exciting winding much larger than would ordinarily be supplied for the same size core, the design of the winding being proportioned such that saturation occurs in the auxiliary field core portion at low values of armature potential.

For the purposes of commutation it may be desirable, particularly in machines of large size, to use commutating poles. I have illustrated commutating poles comprising core portions 19 having exciting windings 20 connected in series relation with the armature circuit in the customary manner.

Figure 2:
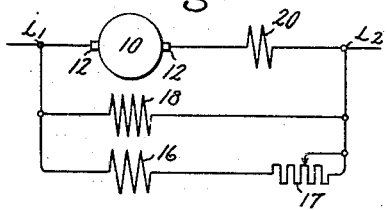
Fig. 2 is a diagrammatic showing of the circuit connections of the generator.

The above described generator circuit connections are clearly illustrated in equivalent form in Fig. 2 of the drawing, the reference numerals corresponding to those used in the description of Fig. 1.

Figure 3:
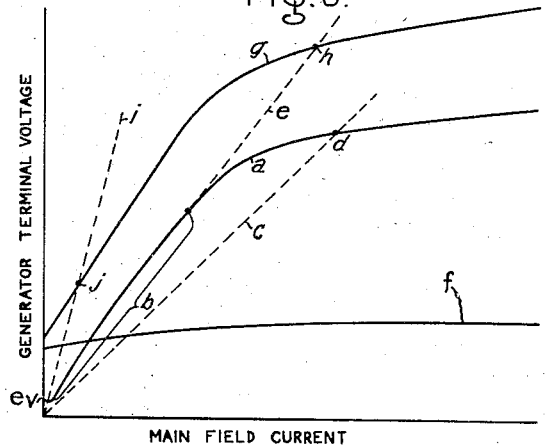
Fig. 3 is a graphical representation useful in explaining the operation of my invention.

The operation of my invention can be best understood by reference to Fig. 3 of the drawing in which the curves show the operating characteristics of the generator when operated at constant speed. First let it be assumed that the auxiliary field winding 18 is disconnected so that the generator becomes a conventional shunt excited generator. The curve $a$ is the magnetization curve or terminal voltage-field current characteristic of the generator when the excitation is supplied solely by the shunt field winding 16. In this curve the terminal voltage of the generator, which is also the voltage of the field winding 16, is plotted as ordinates against the field current as abscissae. Like all magnetization curves for this type of generator, this curve has a portion $b$ which is a substantially straight line and which, when extended, will pass through the origin of coordinates. This portion of the curve extends from below the knee of the curve to slightly above the origin of coordinates where it curves off and intersects the axis of the ordinates at a value of voltage $e_v$ equal to the residual voltage of the machine. The dash line $c$ is a field resistance characteristic for a relatively low value of field circuit resistance. This is always a straight line passing through the origin of coordinates because for a direct current circuit a given value of resistance corresponds, according to Ohm's law, to a given ratio of voltage and current. As shown, this characteristic intersects the magnetization curve $a$ at a point $d$ which will be the point for stable operation of the generator for this particular value of field circuit resistance. If now it is desired to reduce the terminal voltage of the generator, the field circuit resistance is increased by a manipulation of the field rheostat 17. A point may be reached where the value of the field circuit resistance is so high that it produces a field circuit resistance characteristic $e$. As shown, this resistance characteristic $e$ coincides with the portion $b$ of the magnetization curve of the generator and consequently there is no definite intersection point between these two characteristics. At this point the generator will become unstable and the voltage will fluctuate between wide limits. Thus it will be seen that it is impossible to obtain generator voltages below this value corresponding to the limit of stable operation whereby the range of voltage variation of the generator is considerably limited.

Now let it be assumed that the auxiliary field winding 18 is connected in parallel with the armature circuit in accordance with my invention. The curve $f$ in Fig. 3 represents the component of the generator terminal voltage that is produced by the auxiliary field winding 18. The auxiliary core portion 15 saturates at a very low voltage of armature voltage and for maximum stability it may be designed so that the residual voltage $e_v$ is sufficient to cause substantial saturation therein. Therefore the curve $f$ remains substantially flat with increasing values of main field current due to the fact that the auxiliary field winding is saturated and therefore the effect of the auxiliary field winding 18 on the generator terminal voltage remains relatively constant. The resultant or combined effect of the main and auxiliary field windings 16 and 18 gives a modified saturation curve $g$. It will be noted that the modified saturation curve $g$ is displaced from the saturation curve $a$ in such a manner that there will be a definite intersection between all the field circuit resistance characteristic lines and the saturation curve $g$. For example, there will now be a definite intersection point $h$ between the field resistance characteristic $e$ and the magnetization curve $g$, and consequently the generator will be stable at this high value of high resistance. Furthermore, additional increases in the value of the field circuit resistance such as, for example, as illustrated by the resistance characteristic $i$, may be had with perfect stability as is shown by the definite intersection point $j$ between the resistance characteristic $i$ and the modified magnetization curve $g$ of the generator.

It will thus be seen that by providing separate shunt connected main and auxiliary field poles, the auxiliary field pole being designed to saturate below the value of armature potential corresponding to saturation of the main field poles, the range of stable operation of the generator is materially increased in the region below the value of armature voltage corresponding to saturation of the main field poles. It will be noted from Fig. 3 that stable operation of the generator may be obtained even down to the point where the main field current is reduced to zero. The reason for this is the fact that the auxiliary field produces flux independently of the current in the main field circuit. My invention has the further advantage that main field poles of standard design may be used.

While I have illustrated the main and auxiliary field poles 14 and 15 as displaced around the periphery of the field yoke 13, it will be understood that, if desired, they may be placed side by side in a plane passing through the axis of the armature without departing from the scope of my invention in its broader aspects.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a dynamo-electric machine having an armature and a pair of load current brushes displaced 180 electrical degrees from each other, a field excitation system therefor comprising a plurality of energizing windings for producing main and auxiliary fluxes, means forming separate current paths for energizing the main flux and the auxiliary flux producing windings, said paths being connected in parallel with each other and to said brushes, and separate magnetic cores associated with each of said windings, the cores associated with the auxiliary flux producing windings being arranged to saturate at lower values of armature voltage than the cores associated with the main flux producing windings.

2. In a dynamo-electric machine having an armature with an armature winding thereon and a pair of load current brushes displaced 180 electrical degrees from each other, a plurality of field magnets each comprising separate main and auxiliary core portions, a main field winding on each of said main portions connected to said armature winding, and an auxiliary field winding on each of said auxiliary portions, said main and auxiliary field windings being connected in parallel with each other between said brushes, and said auxiliary core portions being arranged to saturate at lower values of potential across said armature winding than said main core portions.

3. A dynamo-electric machine comprising an armature and a pair of load current brushes displaced 180 electrical degrees from each other, a main field pole having a main field winding associated therewith, an auxiliary field pole having an auxiliary field winding associated therewith, said main and auxiliary field windings being connected in parallel with each other and to said brushes, and said auxiliary field pole being arranged to saturate at a lower value of armature voltage than said main pole.

4. A dynamo-electric machine having an armature with a pair of load current brushes displaced 180 electrical degrees from each other and field poles, field windings associated with each of said poles, said windings being connected in parallel with each other and to said brushes, and one or more of said field poles being arranged to saturate at lower values of armature voltage than the remaining ones of said poles.

5. A constant speed direct current generator provided with a main field winding, said generator having a pair of load current terminals between which said main field winding is connected, a voltage regulating rheostat connected in series with said main field winding, said rheostat having an upper range of resistance values which are so high as to cause voltage instability of said generator when said rheostat is operated in said range, and means for preventing such voltage instability comprising an auxiliary field winding connected in parallel with said main field winding and arranged so that both of said windings produce cumulative voltages in said generator, said auxiliary winding being provided with a magnetic core which saturates at a value of generator voltage which is substantially below the value at which voltage instability normally occurs.

RICHARD H. KAUFMANN.